T. D. MAYHALL.
PEANUT AND POTATO DIGGER.
APPLICATION FILED JULY 14, 1914.

1,131,850.

Patented Mar. 16, 1915.

Witnesses

T. D. Mayhall    Inventor
by                Attorneys

UNITED STATES PATENT OFFICE.

TIMOTHY D. MAYHALL, OF GLOSTER, MISSISSIPPI.

PEANUT AND POTATO DIGGER.

1,131,850.     Specification of Letters Patent.     Patented Mar. 16, 1915.

Application filed July 14, 1914. Serial No. 850,999.

*To all whom it may concern:*

Be it known that I, TIMOTHY D. MAYHALL, a citizen of the United States, residing at Gloster, in the county of Amite and State of Mississippi, have invented a new and useful Peanut and Potato Digger, of which the following is a specification.

This invention relates to diggers particularly designed for use in digging peanuts and potatoes, one of its objects being to provide simple means for digging under the potatoes and elevating them into a supporting tray or pan which is connected by suitably disposed spaced hangers to the frame of the digger.

A further object is to provide side blades for cutting into the loosened soil and severing any entangled vegetation or other obstructions in the path thereof, thus to render the structure more easy to operate and to eliminate the choking of the parts, such as has heretofore occurred. With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
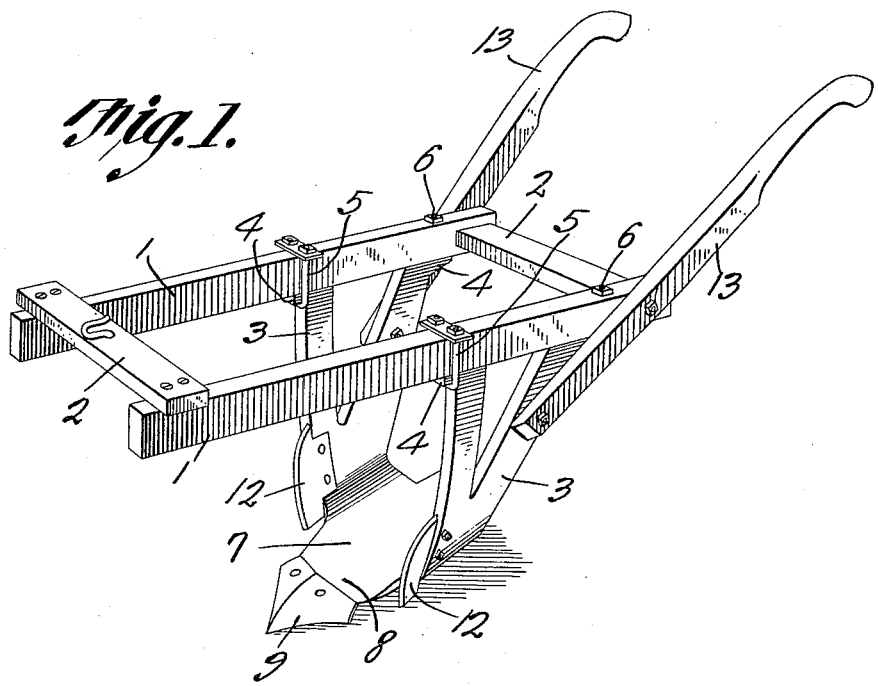
Figure 2:
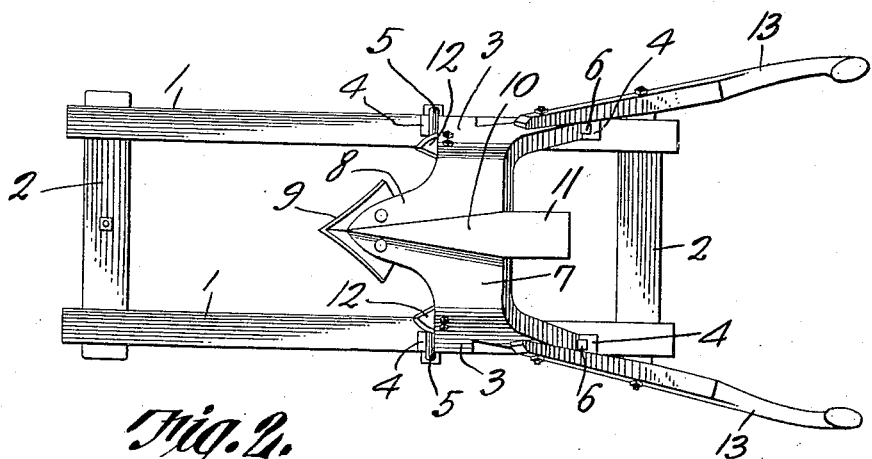

In said drawings:—Figure 1 is a perspective view of a digger constituting the present invention. Fig. 2 is a bottom plan view thereof.

Referring to the figures by characters of reference 1 designates the side members of a frame, said members being connected in any suitable manner as by cross strips 2. Arranged under each of the side members 1 is a substantially V-shaped standard 3, each standard being provided, at its upper end, with horizontally extended lips 4 adapted to be engaged by suitable fastening means whereby the standards are secured to the side beams 1. In the structure illustrated the lips 4 on the front ends of the standards are engaged by U-bolts 5 which, in turn, are secured to the beams 1 while the rearwardly extending lips on the standards 3 are engaged by bolts 6 extending downwardly through the beams 1. It is to be understood, however, that other means of connecting these standards to the side beams may be used.

Each standard is arranged at one side of a base 7 in the form of a pan or scoop having at the center of its front edge, a forwardly extending tongue 8 on which a digging point 9 is detachably secured. A shoe 10 is formed upon or secured to the bottom of the base 7 and projects rearwardly from the base as shown at 11, this shoe being pointed at its front end and adapted to ride within the furrow cut by the point 9.

Detachably secured to the front edge portion of each standard 3 is an upstanding division blade or side cutter 12. As shown in the drawings, the forward or cutting edges of these blades 12 are curved upwardly and rearwardly so as to produce a shearing cut upon any vegetation which may obstruct the path thereof. Handles 13 are secured to the beams 1 and to the standards 3.

It will be apparent that when the digger is drawn forward, the point 9 will plow into the ground under the peanuts or potatoes and will lift them up so that they will be deposited on the base or scoop 7. Any vegetation or other like obstructions in the paths of the standards 3 will be severed by the blades 12 and these blades will also cut through the side portions of the soil elevated by the point 9. Consequently the digger will work through the soil more readily than it would otherwise. It is to be understood of course that when the device is used for digging potatoes, it will be necessary to provide the usual fingers at the back of the base or scoop 7. Inasmuch as this is an old construction, however, it has not been deemed necessary to illustrate it. By utilizing the rearwardly extending shoe 10, the digger can be readily kept in its course.

What is claimed is:—

A digger of the class described, including a scoop-like base, a digging point secured to and extending forwardly from the base, standards at the sides of the base, cutting blades extending forwardly from the standards, and a shoe upon the bottom of the base and extending rearwardly therefrom, said shoe being pointed at its front end.

In testimony that I claim the foregoing as my own, I have hereto affixed my signature in the presence of two witnesses.

TIMOTHY D. MAYHALL.

Witnesses:
GEORGE H. WHITE,
J. H. BUTLER.

Copies of this patent may be obtained for five cents each, by addressing the "Commissioner of Patents, Washington, D. C."